Patented Aug. 15, 1950

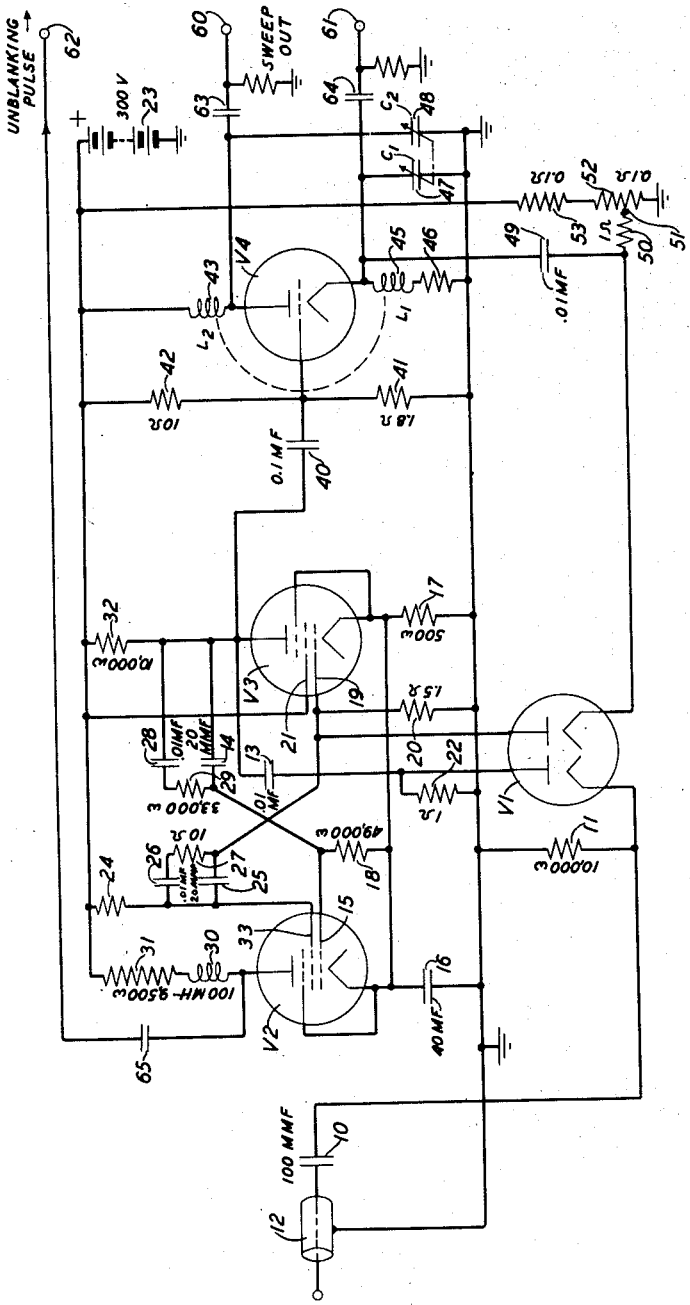

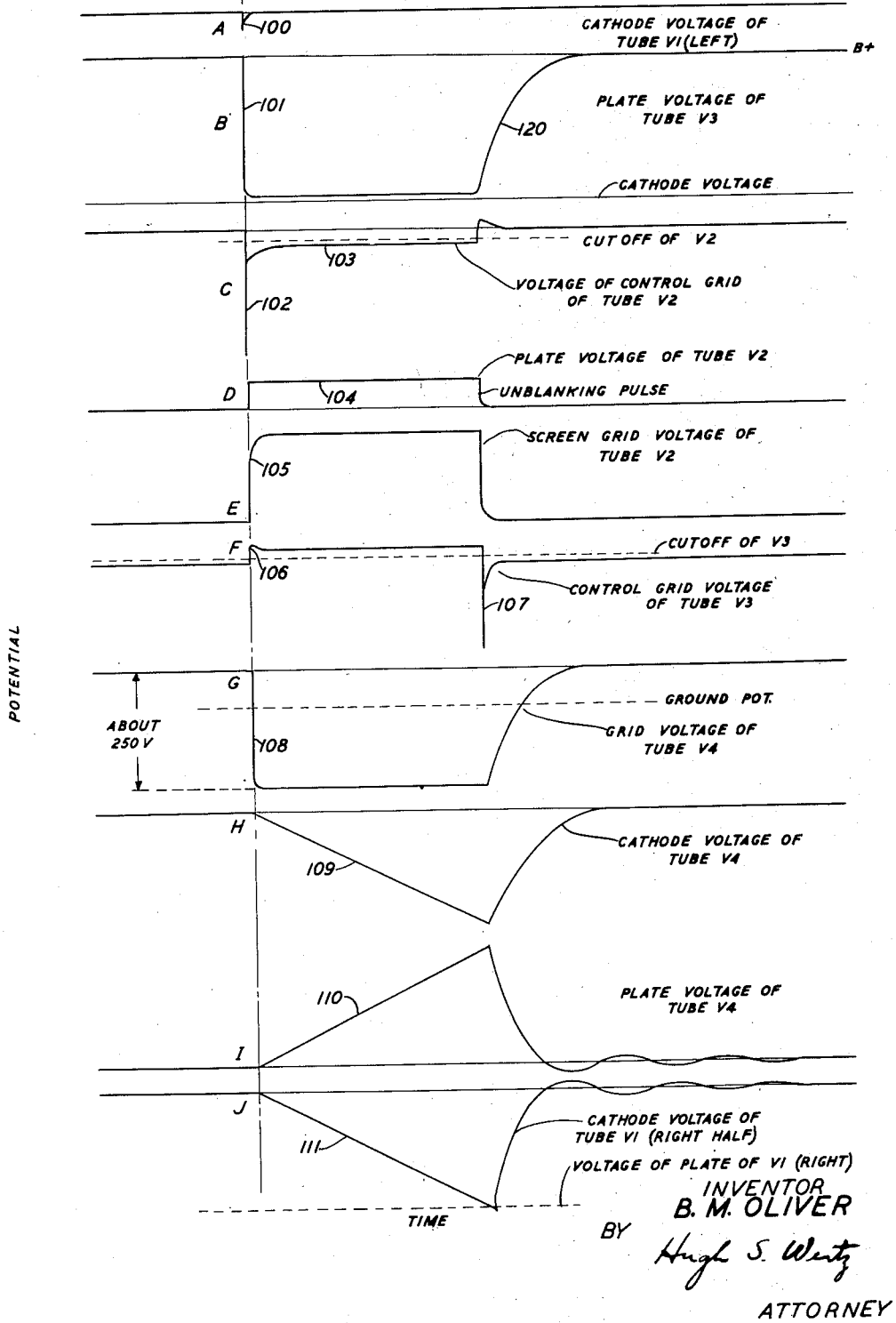

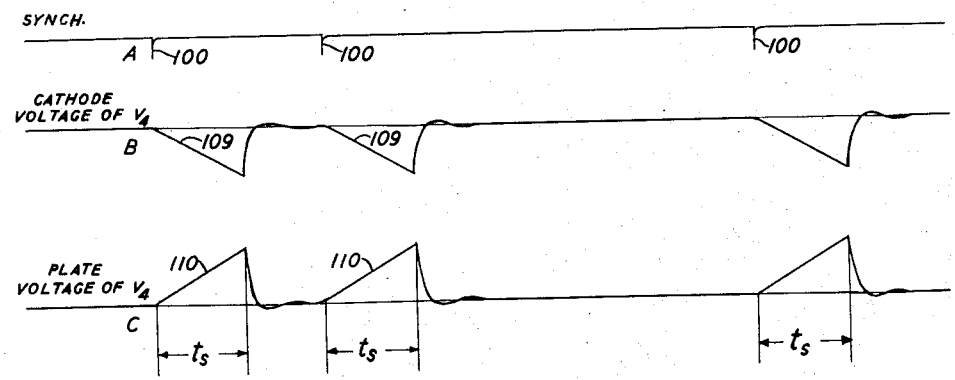
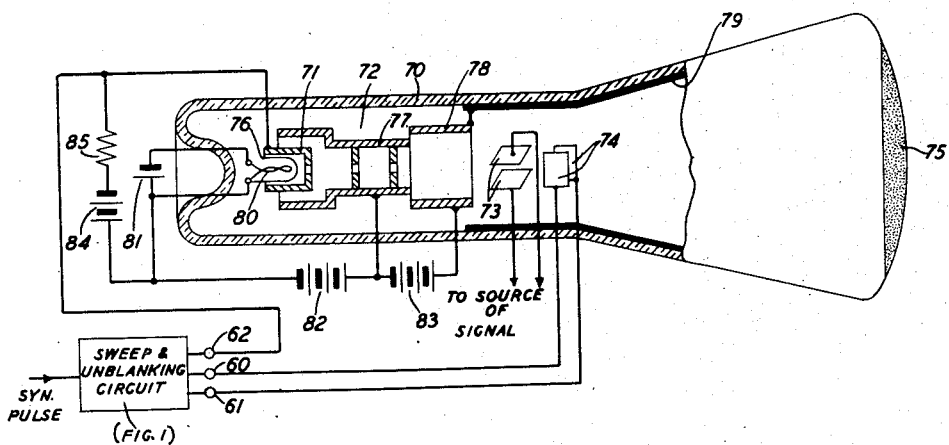

2,519,278

UNITED STATES PATENT OFFICE 2,519,278

PULSE-ACTUATED CIRCUIT

Bernard M. Oliver, New York, N. Y., assignor to Bell Telephone Laboratories, Incorporated, New York, N. Y., a corporation of New York Application November 1, 1944, Serial No. 561,410

3 Claims. (Cl. 250—27)

This invention relates to pulse actuated circuits and more specifically to pulse actuated circuits for sweeping a beam in a cathode-ray tube.

The main object of the invention is to provide an efficient and reliable pulse-controlled sweep circuit, the advantages of which are discussed below. In its broader aspects, however, the invention is applicable outside the field of sweep wave generation.

In pulse reflection type image locating and distance measuring systems (radar systems) such as, for example, in the system disclosed in an application of J. R. Hefele, Serial No. 498,332, filed August 12, 1943, which issued as Patent 2,449,848 on September 21, 1948, ultra-high frequency carrier waves modulated with pulses of very short time duration are emitted, reflections thereof are received from objects upon which the emitted pulses impinge, and the reflection times for particular objects are determined to provide an indication of the distances to the objects from which the respective reflected signals are received. Electrical variations received at the receiving point constitute a plurality of series or trains of impulses, each series comprising, for example, a transmitted pulse and one or more reflections or echo pulses interspersed with and supplemented by variations due to "noise" etc. After detection and amplification, the series of impulses, frequently called the video signal or signals, are applied to one set of deflecting plates in a cathode-ray oscilloscope, to the other set of plates of which is applied a sweep or deflecting wave. The initiation of the sweep waves is controlled by synchronizing pulses from the transmitter, which have a fixed time relation with respect to the corresponding transmitted pulses and produce a series of sweeps each of which lasts for a period less than that between pulses, the beam in the cathode-ray tube being cut off during the time that it is not being swept. By way of example, the transmitted pulses may have a duration of about 1 microsecond and be spaced by intervals of approximately 2500 microseconds (this time need not be constant) while the time for sweeping the beam in the cathode-ray tube may be of the order of 50 to 100 microseconds. Thus the "duty cycle" of the sweep wave (the time interval when the beam is being swept across the screen of the cathode-ray tube) is said to be short since this time interval is small with respect to the time interval between the transmitted pulses and hence between corresponding points in two successive sweep cycles.

It is a further object of this invention to provide a sweep circuit which is actuated by pulses and which produces a wave each cycle of which has a useful sweeping portion which has a duration considerably less than the period of time between pulses, and which is accurate and reliable in operation.

It is another object of this invention to provide a reliable sweep circuit which has an adjustable sweep period and an adjustable amplitude and which produces a substantially linear sweep.

It is another object of this invention to provide an efficient form of pulse-operated wave generating circuit arrangement which produces balanced output voltages.

A specific embodiment of the invention herein chosen for the purpose of illustrative disclosure may be briefly described as follows: The sweep circuit produces balanced deflecting waves having a short duty cycle and suitable for irregular operation, or in other words, suitable for operation in an arrangement wherein the incoming synchronizing pulses are not necessarily evenly spaced in time. The circuit comprises a vacuum tube having similar inductance members in series relation in its output circuit with a point therebetween maintained at a fixed potential and the outside terminals of the members connected respectively to the anode and cathode. A source of potential is connected in this output circuit, preferably between the terminals of the inductance members which are remote from the anode and cathode. One inductance member has a condenser connected across its terminals while the other inductance member has a similar condenser connected across it and the source in series relation. The tube normally passes current but is cut off periodically by a negative pulse produced by a "monovibrator," that is, a multivibrator in which one of the stable states is of indefinite duration. Both condensers become charged during the interval the tube is conducting. After the tube is cut off, the inductance of the inductance members causes the current to continue to flow and varies the charges on the two condensers (called the sweep condensers), one increasing and the other decreasing as the source is connected in one of the current flow paths (after the tube has become non-conducting) and not in the other. For the relatively short time interval corresponding to the duration of the monovibrator pulse, the rate of change of charge is linear and, as one condenser increases its charge at the same rate as the other decreases its charge, a balanced, linear sweep wave can be obtained. The required size of the inductance coils can be decreased by providing mutual inductance between them. When the potential of the cathode (which is connected to vary its potential with change in output voltage) reaches a predetermined value, a diode connected between it and the monovibrator conducts and the monovibrator is reset and ready for another pulse. The bias on the diode can be varied to adjust the amplitude of the sweep. Varying the capacity of the two sweep condensers varies the sweep speed.

While the sweep circuit described above is suitable for use in radar systems, it will be readily apparent that it is in no way limited to use in such a system as it may be utilized in other systems or arrangements which require a sweep circuit which produces an output wave with a shorter deflecting period than the time interval between the synchronizing pulses used to control the initiation of the sweeping or deflecting periods. Moreover, the wave produced may be used for other purposes than to deflect an electronic beam.

The invention will be more readily understood by referring to the following description taken in connection with the accompanying drawings forming a part thereof, in which:

Fig. 1 is a circuit diagram of a sweep circuit in accordance with the invention;

Figs. 2 and 3 are diagrammatical and graphical representations to aid in understanding the operation of the circuit of Fig. 1; and Fig. 4 shows an oscillograph tube utilizing a circuit of this invention.

Referring more particularly to the drawings, Fig. 1 shows, by way of example to illustrate the principles of this invention, a circuit for producing a recurrent sweep wave which may be used for deflecting the beam in a cathode-ray tube. The circuit also produces a pulse for "unblanking" or brightening the beam in the tube while the beam is being deflected or swept across the screen. The circuit shown in this figure comprises four vacuum tubes V1, V2, V3 and V4 and their associated circuit connections. Input or synchronizing pulses of relatively short duration and of negative polarity are applied through the coupling condenser 10 to the cathode of the left half of the double diode V1, this cathode being connected to ground through the resistor 11. If the pulses in the input circuit 12, which is hereby shown merely by way of example as a coaxial cable, are not of negative polarity, a phase inverter tube may be connected between the input circuit 12 and the tube V1. The anode of the left half of tube V1 is connected to ground through the resistor 22 and through the coupling condenser 13 to the anode of the tube V3. It is also connected through the coupling condenser 14 to the first or control grid 15 of the tube V2.

The tubes V2 and V3 are connected as a monovibrator acting in response to a pulse in the input circuit 12 to produce an output pulse of longer duration, as will be pointed out below. The tube V2 has its cathode connected to its third or suppressor grid and through a condenser 16 to ground, this condenser being shunted by resistor 17. The cathode of the tube V2 is also connected directly to the cathode of the tube V3. The grid 15 of the tube V2 is connected through a leak resistor 18 to the cathodes of the two tubes, while the first or control grid 19 of the tube V3 is connected through the leak resistor 20 to ground. The suppressor grid of the tube V3 is connected to its cathode while the second or screen grid 21 is connected to the positive terminal of a source 23 of about 300 volts, the negative terminal of the source 23 being connected to ground. While the source 23 has been shown as a battery, it is obvious that any other source suitably filtered to produce a steady voltage may be used instead. The screen or second grid 33 of the tube V2 is connected to the positive terminal of the source 23 through a resistor 24 and to the first grid 19 of the tube V3 through a small condenser 25 which has connected in parallel therewith the R-C circuit comprising a larger condenser 26 and a large resistance 27. Similarly, the small condenser 14 connected between the anode of the tube V3 and the first or control grid 15 of the tube V2 is shunted by the R—C circuit comprising a larger condenser 28 and the resistance 29. The anode of the tube V2 is connected through the inductance 30, used for high-frequency equalizing purposes, and the resistor member 31 to the positive terminal of source 23, while the anode of the tube V3 is connected to the positive terminal of the same source through the resistor 32.

The anode of the tube V3 is connected through the coupling condenser 40 to the grid of the triode V4. The grid of tube V4 is connected to ground through the resistor 41 and through the resistor 42 to the positive terminal of source 23. By this potentiometer arrangement, the grid of the tube V4 is placed at a positive potential. The anode of the tube V4 is connected through inductance member 43 to the positive terminal of the source 23, while the cathode thereof is connected through inductance member 45, equal to inductance member 43, and the resistor 46 to ground. A condenser 47 is connected between the cathode of the tube V4 and ground while a condenser 48 of like capacity is connected between the anode of the tube and ground. When the capacities of the condensers 47, 48 are changed, they are preferably changed by equal amounts. The cathode of tube V4 is connected through the coupling condenser 49 to the cathode of the right half of the tube V1, the anode of which is connected directly to the first or control grid 19 of the tube V3. The cathode of the right half of tube V1 is connected through a resistor 50 to the variable tap 51 of a potentiometer 52, one end of which is connected to ground and the other end of which is connected through a resistor 53 to the positive terminal of the source 23. The output terminals 60 and 61 of the sweep circuit are connected through the blocking condensers 63 and 64 to the anode and cathode, respectively, of the tube V4 while an "unblanking" or brightening output pulse is taken from the terminal 62 which is connected through blocking condenser 65 to the anode of the tube V2. These three terminals are connected to the cathode-ray tube 70 shown in Fig. 4.

The tube 70 includes an envelope enclosing an electron gun 72 including a control element 71, two sets of deflecting plates 73 and 74, and a flourescent screen 75. The electron gun 72 comprises a cathode 76, the control element 71, a first anode 77 and a second anode, including cylindrical member 78 and a conducting coating 79, for forming and accelerating a beam of electrons and for focussing it into a spot upon the fluorescent screen 75. The cathode 76 is heated by a filament 80 which is supplied with current from a source of potential 81. The anode 77 is positively biased with respect to the cathode 76 by means of a source of direct potential 82, while the anode members 78, 79 are positively biased with respect to the anode 77 by means of the source of direct potential 83. Signals are applied from the terminal 62 to the control element 71 in order to "unblank" the beam during substantially the time period the active part of the sweep wave is being applied from the terminals 60, 61 to the deflecting plates 74. At other times the beam is blanked out because of the negative bias applied to the control element 71 by means of the source of direct potential 84 connected between the cathode 76 and the control element 71. A leak resistor 85 is also connected in this circuit. To the other set of deflecting plates 73 is applied any suitable signal a visual representation of which is to be viewed on the screen 75.

The operation of the circuit shown in Fig. 1 will now be described, reference also being made to Figs. 2 and 3.

A synchronizing or initiating pulse 100 (line A, Fig. 2) which may be, by way of example, a synchronizing pulse produced in the transmitter of a radar system such as that shown in the above-mentioned Hefele patent, is applied to the input coaxial cable 12. This pulse is assumed to be of negative polarity and to have a sharp leading edge. This leading edge of the input pulse 100 is transmitted by the condenser 10, the left half of the twin diode V1 and the condenser 13, and causes a sudden drop in the plate potential of the tube V3. This sudden drop in potential is also transmitted by condenser 40 to the grid of the tube V4 and by condenser 14 to the control grid of the tube V2. As the control grid of the tube V2 is driven negative, the screen grid and plate currents decrease, and the potentials of these elements rise. As the screen grid 33 of the tube V2 rises in potential abruptly, the coupling condenser 25 carries the control grid of the tube V3 positive, as shown in the portion 106 of the wave shown in line F of Fig. 2, and causes full plate current to be drawn by this tube. The full plate current in tube V3 drops the plate potential below the value caused by the input pulse and the control grid of tube V2 is carried farther negative completely cutting off the latter. The potential of the plate of the left diode of the tube V1 is also carried below that of the cathode and this diode stops conducting currents, thus disconnecting the plate of the tube V3 from the input circuit and preventing any reaction of either on the other. All of the above actions take place substantially instantaneously compared with the duration of the pulses generated by the circuit, or, in other words, during the time of the leading edge of all the waves shown in lines A to G in Fig. 2. During this time, as noted above, space current is stopped in tube V2 and initiated in tube V3 and as a result the screen grid potential of tube V2 has risen suddenly and the plate potential of tube V3 has dropped suddenly.

The drop in the plate potential of tube V3 is transmitted by the condenser 14 to the control grid of tube V2 as a large negative step, but since the time constant of condenser 14 and resistor 18 is very short the control grid potential of tube V2 rises exponentially to a value just below cut-off completing the spike 102 in the wave shown at line C, Fig. 2. The portion 103 of the wave of line C, Fig. 2, is also an exponential curve but with a comparatively very long period since the time constant of the condenser 28 and the resistors 18 and 29 is made very large. As a result, the potential of that part of the wave represented by the portion 103 remains nearly constant during the sweep and is below the cathode potential of tube V2 by an amount equal to the drop in plate potential of tube V2 multiplied by the ratio of the resistance of resistor 18 to the sum of the resistances of resistor 18 and of resistor 29.

When the screen of tube V2 goes positive, as shown by the portion 105 of the wave shown at line E of Fig. 2, the coupling condenser 25 carries the control grid of tube V3 positive, as already noted. Grid current in tube V3 then quickly charges condenser 25, but the control grid of tube V3 is held positive by a flow of current from source 23 through resistor 24, condenser 26, resistor 27 and resistor 20, this current producing a voltage drop across resistor 20 which holds the control grid positive with respect to ground. Thus the tubes V2 and V3 quickly reach a temporarily stable state with tube V2 just cut off and tube V3 conducting with its control grid being held only slightly positive. Since condenser 14 is discharged and condenser 25 is charged at this time, a small positive voltage applied to the grid of tube V2 or a small negative voltage applied to the grid of tube V3 causes the circuit to revert to the initial stable state which existed before the advent of the input pulse 100 shown at line A of Fig. 2.

Before the arrival of the input pulse, the grid of the tube V4 is at a positive potential with respect to ground, as determined by resistors 41 and 42. The cathode of tube V4 is slightly more positive than its grid because of the cathode current flowing through resistor 46. When the potential of the plate of tube V3 drops suddenly (see the portion 101 of the wave shown at line B, Fig. 2), the coupling condenser 40 carries the control grid of tube V4 negative (see the portion 108 of the wave shown at line G, Fig. 2) and since the cathode of tube V4 cannot drop as abruptly (because of condenser 47), tube V4 is cut off. The current which was flowing from the positive B-supply through inductance 43, tube V4, inductance 45, and resistor 46 to the grounded side of the battery is cut off but a charging current from the battery 23 now flows into condenser 48, charging this condenser, while at the same time the condenser 47 discharges through inductance 45 and resistance 46. If the inductance of the members 43 and 45 were infinite, the current would remain constant over the sweep time and condenser 48 would have its charge varied in a positive direction and condenser 47 would have its charge varied in a negative direction (either a decrease of a positive charge or an increase of a negative charge) at a constant rate. Thus the potential across $C_2$ (condenser 48) would rise and the potential across $C_1$ (condenser 47) would fall at a constant rate given by $$\frac{de}{dt} = \frac{I_0}{C} \qquad (1)$$

where $e$ = voltage across the condenser
$I_0$ = current through inductances 43 and 45 (and through V4, prior to the arrival of the input pulse)
$C$ = capacity of $C_1$ or $C_2$, and
$t$ = time.

A balanced output wave, that is, one in which the derivatives with respect to time of the voltages at the two terminals of the circuit are always equal in magnitude and of opposite sign, can normally be obtained by making $C_1 = C_2$. It can be seen that with the inductance members infinitely large, $$\frac{de}{dt}$$

is constant, so that a linear sweep is obtained.

If the inductance of the coils 43 and 45 is not infinite, the sweep voltage across $C_2$, for example, will be given very nearly by:

$$e_s = I_0 \sqrt{\frac{L}{C}} \sin \omega t \qquad (2)$$

where $$\omega = \frac{1}{\sqrt{LC}}$$

so that $$\frac{de}{dt} = \omega I_0 \sqrt{\frac{L}{C}} \cos \omega t$$

and $$\frac{de}{dt} = \frac{I_0}{C} \cos \omega t \qquad (3)$$

If $E_s$ = final value of sweep voltage required on each cathode ray tube plate
$t_s$ = total sweep time $$\lambda = \frac{\text{final sweep velocity}}{\text{initial sweep velocity}}$$

then $$\lambda = \cos \omega t_s \qquad (4)$$

$$\omega = \frac{1}{t_s} \cos^{-1} \lambda = \frac{1}{\sqrt{LC}} \qquad (5)$$

and therefore $$E_s = I_0 \sqrt{\frac{L}{C}} \sin \left( \frac{1}{t_s} \cos^{-1} \lambda \right) t_s$$

$$E_s = I_0 \sqrt{\frac{L}{C}} \sqrt{1 - \lambda^2} \qquad (6)$$

Combining Equations 5 and 6 gives $$C = \frac{I_0 t_s}{E_s} \frac{\sqrt{1 - \lambda^2}}{\cos^{-1} \lambda} \qquad (7)$$

$$L = \frac{E_s t_s}{I_0} \frac{1}{\sqrt{1 - \lambda^2} \cos^{-1} \lambda} \qquad (8)$$

Equation 7 gives the values of $C_1$ and $C_2$ required to generate a sweep of amplitude $E_s$ in a time $t_s$ having a linearity $\lambda$. $I_0$ is the current in tube V4. Equation 8 gives the minimum value of inductance required to achieve the linearity $\lambda$. The inductance L is ordinarily computed for the worst case (that is, longest time, greatest voltage and least current) and is then left fixed at this value.

As $\lambda \to 1$ $$\cos^{-1} \lambda \to \sqrt{1 - \lambda^2}$$

So that for nearly linear sweeps, $$C \simeq \frac{I_0 t_s}{E_s} \qquad (9)$$

$$L \simeq \frac{E_s t_s}{I_0} \left( \frac{1}{1 - \lambda^2} \right) \qquad (10)$$

If the two coils 43 and 45 are wound series aiding on a common core and tightly coupled, the inductance of each winding may be one half that given by Equation 8 or 10.

The sweep velocity is ordinarily changed by varying C (see Equation 1). The sweep amplitude is limited to the potential to which the cathode of the second half of the double diode V1 is held by the resistances 50, 52 and 53. When during the sweep the cathode of the right half of the tube V1 is driven negative by the sweep voltage, nothing happens until this cathode drops below its anode potential at which point the diode conducts and trips the sweep circuit back to normal by applying a sharp negative pulse 107 to the grid of the tube V3 as shown in line F of Fig. 2, thus cutting off the tube V3 and making its plate voltage swing in the positive direction, as represented by the portion 120 of the wave shown in Fig. 2, line B. For the duration of the sweep portions 109 and 110 of the waves shown in lines H and I of Fig. 2 (and in lines B and C of Fig. 3), the beam of the cathode-ray tube 70, to the deflecting plates 74 of which the sweep potentials are applied from the terminals 60 and 61, is blanked off by the source 84. The beam is unblanked by the positive pulse 104 applied to the control member 71 during the sweep time. This pulse is shown at line D of Fig. 2.

Circuit constants of an arrangement in accordance with this invention which has been actually constructed and satisfactorily operated have been indicated on the drawing. It is to be understood, however, that the invention is not limited to the use of elements having these particular constants.

Although the present invention has been described in terms of a preferred illustrative embodiment, it should be realized that the invention and its several features are capable of being embodied in a wide variety of other forms and hence the invention is to be understood as comprehending such other forms as may fairly come within the spirit and letter of the claims. For example, the condensers $C_1$ and $C_2$ can be replaced by two terminal impedances of any suitable configuration. Moreover, the tube V4 can be replaced by an electromagnetic relay whose contacts are closed by the rise of anode potential in tube V3 and whose contacts open when this potential drops by any other suitable switching device.

What is claimed is:

1. The combination of a condenser with a source of direct potential for placing a charge thereon, an inductive element through which charging current for said condenser flows from said source, a second condenser having one terminal connected to a terminal of said first condenser for maintaining said terminals at substantially the same potential, means for maintaining said potential fixed in value, a current control element having its terminals connected respectively to a terminal of said first condenser and a terminal of said second condenser neither of which terminals is maintained at fixed potential, a second inductive element in a path having one terminal connected to said condenser terminals having a fixed potential so as to maintain said terminal of said path at said fixed potential, the other terminal of said path being connected to the terminal of said second condenser which is not maintained at a fixed potential, and means including a voltage pulse generator for alternately changing the conductivity of said current control element from a very low value to a relatively high value and from said high value to said low value, said means being under control of a varying potential dependent upon the potential of one of said condenser terminals the potential of which is not fixed.

2. The combination of claim 1 in which said current control element comprises a space current device having an anode, a cathode and a control element, and said last-mentioned means is connected to vary the potential of said control element with respect to said cathode.

3. In combination, a space current device having an anode, a cathode, and a control element, said anode and cathode being connected respectively to the terminals of a path including two similar inductances in series relation, a source of direct potential connected between the ends of the inductances remote from said anode and cathode, a shunt path between the anode and cathode of said space current device comprising two similar impedance members in series, means for maintaining a point in said shunt path between said impedance members at a reference potential, a conductive connection between said point in the shunt path and the path including said inductances at a point between said inductances, means connected to said control element to render said tube conducting in the absence of input signals, and means for applying a negative pulse wave as an input signal to the control element of said space current device to render said tube non-conducting.

BERNARD M. OLIVER.

REFERENCES CITED

The following references are of record in the file of this patent:

UNITED STATES PATENTS

| Number | Name | Date |
| --- | --- | --- |
| 2,125,732 | Bowman-Manifold et al. | Aug. 2, 1938 |
| 2,153,217 | Van Der Mark | Apr. 4, 1939 |
| 2,168,508 | Barthelemy | Aug. 8, 1939 |
| 2,178,464 | Baldwin, Jr. | Oct. 31, 1939 |
| 2,180,364 | Norton | Nov. 21, 1939 |
| 2,225,469 | Diebold | Dec. 17, 1940 |
| 2,241,256 | Gould | May 6, 1941 |
| 2,250,202 | Matusita | July 22, 1941 |
| 2,265,290 | Knick | Dec. 9, 1941 |
| 2,354,668 | Hallmark | Apr. 4, 1944 |
| 2,363,810 | Schrader et al. | Nov. 28, 1944 |
| 2,414,486 | Rieke | Jan. 21, 1947 |